Dec. 17, 1935.  E. D. TILLYER  2,024,552
OPHTHALMIC LENS
Filed Jan. 23, 1933
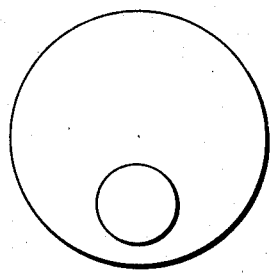
FIG. I
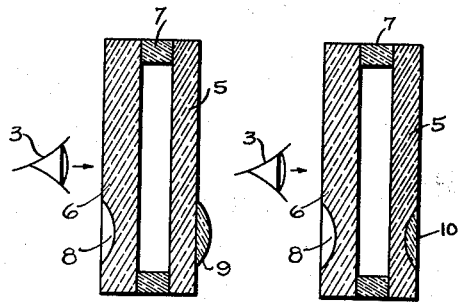
FIG. II  FIG. III
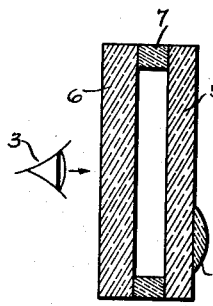
FIG. IV
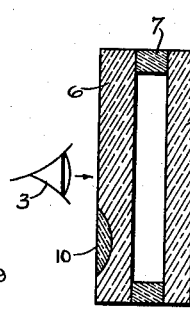
FIG. V
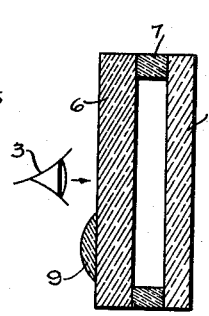
FIG. VI
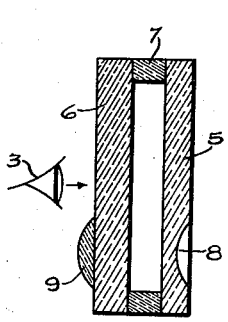
FIG. VII
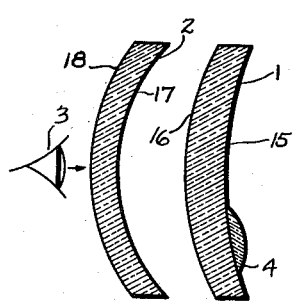
FIG. VIII
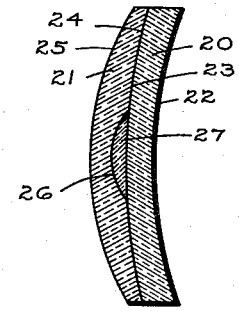
FIG. IX
INVENTOR
EDGAR D. TILLYER
BY
Harry H. Styll
ATTORNEY Patented Dec. 17, 1935

2,024,552

UNITED STATES PATENT OFFICE 2,024,552

OPHTHALMIC LENS

Edgar D. Tillyer, Southbridge, Mass., assignor to American Optical Company, Southbridge, Mass., a voluntary association of Massachusetts Application January 23, 1933, Serial No. 653,058

6 Claims. (Cl. 88—54)

This invention relates to improvements in lenses and more particularly to lenses embodying means for changing the size of image from the focal prescription requirements of the eye without change of focus thereof and comprising a plurality of focal fields together with an improved process of making the same.

One of the principal objects of the invention is to provide a lens of this character with fields of different powers and/or magnifications.

Another object of the invention is to provide an improved process for making lenses of this character.

Other objects are to provide lenses of this character having increased power for the reading distance and/or having different power and/or magnification of the reading portion, from that of the distance portion, and/or having the reading portion of the same power as the distance portion but of different magnification, that is to say, lenses having a distance portion including means for change of size of image over the prescription requirements without change of focus thereof and another portion different from the first portion.

Other objects and advantages of the invention will become apparent from the following description taken in connection with the accompanying drawing. It will be apparent that many changes in the arrangement of parts, details of construction and steps of the process may be made without departing from the spirit of the invention as expressed in the accompanying claims. I, therefore, do not wish to be confined to the exact matters shown and described as the preferred forms have been shown by way of illustration only.

Referring to the drawing:

Figure I is a front view of a lens embodying the invention.

Figure II is a cross section showing one form of the invention.

Figure III is a cross section showing another form of the invention.

Figure IV is a cross section showing another form of the invention.

Figure V is a cross section showing another form of the invention.

Figure VI is a cross section showing another form of the invention.

Figure VII is a cross section showing another form of the invention.

Figure VIII is a diagrammatic view in cross section showing the relation of the lens to the eye, and Figure IX is a cross section of another form of the invention.

In the past eye corrections embraced the corrections for sphere, cylinder and prism, one, two or all. Recently a fourth correction has been added to these, namely, a correction for the difference in size of image of the two eyes or in different meridians of an eye without a change of the focus of the prescription requirements of the eye. The inclusion of this fourth element has introduced difficulties into the art of lens making not hitherto encountered; either additional lens surfaces are required or a modification of the sperical, cylindrical or toris curves now in use. The new problem introduces practically a new art in eye examination and in the art of making lenses. These difficulties are increased where it is attempted to provide the new form of lenses with fields for both distance and reading distances. It is, therefore, the main object of this invention to provide lenses of the new form with both distance and reading fields and to provide a practicable and economical process for making them.

Referring to the drawings wherein like characters of reference indicate like parts throughout:—

In Figure VIII I have shown an elementary lens of two parts designed to change the size of image of the focal prescription requirements without change of power thereof. The eye is shown at 3. The element 1 is the ordinary prescription lens having the surfaces 15 and 16 designed in the usual prior art way for corrections of sphere, cylinder and prism, one, all or any. The element 2 is the element that provides the change in size of image from the focal prescription requirement without change of power thereof. It has the surfaces 17 and 18 arranged as follows:

The relationship of the surfaces 17 and 18 is such as to provide no optical power but a magnification. These surfaces may be flat, spherical, aspherical or cylindrical. The amount of change in size depends upon the curvatures of the two surfaces and the thickness of the element. Where change in size of the two major meridians is desired spherical surfaces are used; when change in one meridian only cylindrical surfaces are used. Such a lens element produces size change without power change. In such a lens element the two surfaces in order to produce no optical power are nearly concentric. When the concave side of the element is placed nearest the eye the size of image is increased; when the convex side of the element is nearest the eye the size of image is decreased. The desired change in size is obtained by the optical relationship of the two surfaces of the element and the thickness thereof. The magnification in a no optical power element is due to the bending or curving of the element. If an object is viewed through a plane parallel, the effect of this plane parallel is negligible. If, however, we bend the plane parallel as happens when it is ground on different base curves, a magnification will be produced. The element 2 is so curved or bent to give the desired amount of magnification.

For description of lenses of this nature see article entitled "Lenses for changing the size and shape of dioptric images" by Ames, Gliddon and Ogle of the department of research in physiological optics, Dartmouth Medical School, Hanover, New Hampshire, contained in a pamphlet reprint from The Annals of The Distinguished Service Foundation of Optometry, Boston, Massachusetts, 1932 page 27.

The method of constructing a "size" lens, having focal power and in addition thereto a size magnification, independent of the magnification due to power is old in the art being set forth in United States Letters Patent #1,933,578 to Ames Nov. 7, 1933.

The method of obtaining the thicknesses, surfaces, separations, and lens characteristics are set forth in this patent, with the necessary formula and examples, etc. The lens of the said Ames patent is the lens of the publication referred to above. The lens produced gives the required axial focal power and the required "size" magnification. As explained in the said patent the characteristics are, the distance from the eye, the distance to the object, the thickness, and separations, and the curvatures of the surfaces. The "size" element is a function of the form or shape of the lens and the thickness, the power element is the relationship of the surfaces one to the other as usual in prior art lenses.

The first step in the invention is to calculate the basic "size" and power lens for a given distance of object as described in said publication and patent. This is usually the major or reading field of the lens of the invention.

For the purpose of providing an additional field a second focal field 4 for the reading distance is placed on the lens, the other portion of the lens being arranged for distance vision.

The arrangement of the two fields will be dependent on the optical requirements for each field. In Figures II to VII inclusive, I have shown the surfaces of the distance field elements as flat. It will be understood that these surfaces will be curved in most instances as called for by the various prescriptive requirements as well understood in the art. I have also shown these lens elements as separated. It will be understood that these elements may be separated or abutted one against the other and secured together by cement or fusing or otherwise, or if modified surfaces are used they may be made in one piece.

The reading field 4 may be made with a segment cemented on or fused or may be ground in one piece with the lens element. The shape of the reading field may be as desired, circular or other conformation, and the segment may be in one piece or of a plurality of sections as desired. The construction and arrangement of this field may be in accordance with any of the reading fields known in the art and may be placed in any desired relation to the distance field as well known in the art. The segment field may be applied to a full sized lens or to a reduced sized lenticular lens as well.

In Figure II the distance field is comprised of the lens elements 5 and 6 held apart by the spacer member 7. This field includes in its optical corrections the means for changing the size of image without change of focus in combination with the required correction for sphere, cylinder and prism, as the case may be, through the relationship of the optical surfaces placed on the elements 5 and 6. This field then has power and magnification of a required amount. In the element 6 is placed the recess 8 having an optical surface and on the element 5 and in line with 8 the raised optical surface 9. The surfaces 8 and 9 are related optically to give a required power and magnification different from that of the distance field. As shown the magnification will be increased. The optical surfaces 8 and 9 are of optical conformations and structure well known in the art for producing the required optical properties. The part 9 may be integral with 5 or a separate piece cemented or fused thereon. The resultant lens will produce a distance field of required power and magnification and a reading field of required power and magnification different from the distance field.

If the added lens system represented by 8 and 9 is to have focal power and one size magnification the system is calculated just as a prior art focal power lens, if it is also to have size magnification for a given distance of object it is calculated by the method of the said Ames patent. Both calculations are prior art procedures. As shown the lens system represented by 8 and 9 have both a different focal power, and a different "size" magnification from the major field.

The procedure is to first calculate the major field to required power and "size" magnification to the required distance of object and then to calculate the minor field to required focal power and "size" magnification to required distance of object and then produce the major lens, and impose the minor one thereon. Both fields are calculated by prior art methods as stated, and the surfaces are made, and the lens constructed by well known prior art methods of grinding and polishing. The surfaces are of types well known in the art. The invention is new and novel in the calculated relationships of the lens elements to produce size magnifications at different distances and in the result obtained. The process comprises a new series of steps to so relate the parts for the desired results.

As set forth in the said Ames patent in the formula therein, one of the elements of a "size" lens is the distance of the object from the eye. The major lens is primarily for distant vision, i. e., for sight of a relatively distant object. The minor lens is primarily for reading distance or distances nearer than the object of the major field, hence the distances being different for the two fields the "size" magnifications for the two fields may also be different.

In considering the focal powers of the two fields as well as the "size" magnifications therefor, it is to be understood that as usual in prior art lens considerations zero power is the transition point from plus to minus powers, and zero magnification is the transition point from plus to minus magnifications. Zero therefore is considered a power or magnification as the case may be, to provide the transition between plus and minus powers and magnification.

The lens of Figure III will give the same results as the lens of Figure II and is the same in structure except that the segment 10 is an insert of a glass of different index of refraction from the glass of element 5 operating on an optical principle well understood in the art to produce a different power from the element 5. The insert 10 may be cemented or fused in the recess in the element 5. The curve of the recess is optically arranged and constructed.

In Figures II and III the reading field may be made with the same power as the power of the distance field and only the magnification be changed, if desired.

The lenses of Figures IV to VI inclusive, will each produce lenses having a distance field including power and magnification and a reading field having the same magnification as the distance field but a greater power for reading. In Figure IV the reading field is produced by the segment 9 arranged on the element 5 as in Figure II, the surface of 9 being made to the curvature to produce the required additional power as is well known in the art. In Figure V the insert 10 is positioned in the element 6 as explained above in connection with Figure III. In Figure VI the segment 9 is arranged on the element 6 instead of on the element 5 as in Figure IV. These lenses add additional power for reading to the distance field.

In Figure VII is shown a lens that gives a distance field of required power and magnification and a reading field of required power and magnification but different from that of the distance field. In this lens the magnification will be decreased. This lens is just the reverse of the lens of Figure II. The segment 9 is placed on the element 6 and surface 8 on the element 5. In this lens the reading field may be made the same power as the distance field and only the magnification of the reading field be changed if desired.

It is apparent that with the four lens surfaces of the elements 5 and 6 and the additional surfaces of the segments 9 and 10 and the recess 8 that a great latitude is afforded in making optical combinations for the regular corrections for sphere, cylinder and prism as well as for change in magnification without change in focus.

It will be understood that the separate lens elements may be made of glasses of any desired indices of refraction and that the said elements may be secured together by uniting their entire peripheral edges or by uniting the said edges only at a few selected spots. This uniting depends largely upon the shape and curvatures of the elements.

In Figure IX is shown a lens comprising two elements 20 and 21, having the surfaces 22, 23, 24, and 25. The surfaces 23 and 24 are comating and the two elements are fitted together on these surfaces, being cemented, fused or otherwise held together. In the surface 24 of the element 21 is made the recess 26 and in this recess is fitted the segment 27. This segment is of a different index of refraction from 21 and is cemented, fused or otherwise secured in the recess 26. The segment is designed to give the reading power and the surfaces 22 and 25 may be related to give the desired focal power and include the correction desired for magnification or change of size of image. This arrangement permits the making of desired surfaces on the faces 22 and 25 independent of the segment. These surfaces may be either spherical or nonspherical as required to give required power and magnification. This arrangement permits the use of toric or aspherical curves on either of these surfaces whereby the lens may be corrected for marginal astigmatism as well if desired. The outer surfaces are entirely independent of the surfaces of the segment.

From the foregoing it will be seen that I have provided simple, efficient and economical means for carrying out all the objects of the invention and for obtaining its advantages.

Having described my invention I claim:—

1. A lens comprising a plurality of aligned lens units forming a major focal field, each of said units being of substantially the full size of the lens, a segment or minor focal field positioned on one of said units within a portion only of the field of said unit, said segment having a surface factor to produce a required refractive power in combination with the parts of the main lens aligned with it, and a thickness and shape factor to produce a required magnification in combination with the parts of the main lens aligned with it, one of said focal fields being optically equivalent to a lens system comprising two aligned lens parts, one of said parts having optical surfaces on its two sides of curvatures to produce a required refractive power and the other of said parts having optical surfaces on its two sides of curvatures to produce a no power refractive power and a required magnification, said magnification being a function of the thickness of said part and its shape due to the bending or cupping thereof.

2. A lens comprising a plurality of aligned lens units forming a major focal field, each of said units being of substantially the full size of the lens, a recess in a surface of one of said units, a segment of glass of different index of refraction from said unit secured in said recess to form a minor focal field over a portion only of said unit, said segment having a surface factor to produce a required refractive power in combination with the parts of the main lens aligned with it, and a thickness and shape factor to produce a required magnification in combination with the parts of the main lens aligned with it, one of said focal fields being optically equivalent to a lens system comprising two aligned lens parts, one of said parts having optical surfaces on its two sides of curvatures to produce a required refractive power and the other of said parts having optical surfaces on its two sides of curvatures to produce a no power refractive power and a required magnification, said magnification being a function of the thickness of said part and its shape due to the bending or cupping thereof.

3. A lens comprising a plurality of aligned lens units forming a major focal field, a segment or minor focal field positioned on an inner surface of one of said lens units to overlie a portion thereof only, said segment having a surface factor to produce a required refractive power in combination with the parts of the main lens aligned with it, and a thickness and shape factor to produce a required magnification in combination with the parts of the main lens aligned with it, one of said focal fields being optically equivalent to a lens system comprising two aligned lens parts, one of said parts having optical surfaces on its two sides of curvatures to produce a required refractive power, and the other of said parts having optical surfaces on its two sides of curvatures to produce a no power refractive power and a required magnification, said magnification being a function of the thickness of said part and its shape due to the bending or cupping thereof.

4. A lens comprising a plurality of aligned lens units, said units being optically equivalent to a lens system comprising two aligned lens parts, one of said parts having surfaces on its two faces of curvatures to produce a required refractive power in the part, and the other of said parts having surfaces on its two faces of curvatures to produce a no power refractive power and a required magnification, the magnification thereof being a function of its thickness and its cupped or bent shape, and a segment or minor field having a desired refractive power positioned on one of the inner surfaces of said aligned lens units so as to cover a portion only of the field of said aligned units, said segment having a surface factor to produce a required refractive power in combination with the parts of the main lens aligned with it, and a thickness and shape factor to produce a required magnification in combination with the parts of the main lens aligned with it.

5. A lens comprising a plurality of aligned lens units being optically equivalent to a lens system comprising two aligned lens parts, one of said parts having surfaces on its two faces of a curvature to produce a required refractive power in the part, and the other of said parts having surfaces on its two faces of curvatures to produce a no power refractive power and a required magnification, the magnification thereof being a function of its thickness and its cupped or bent shape, said aligned units having comating inner surfaces and a segment or minor field having a desired refractive power positioned between the said comating inner surfaces of the said aligned lens units so as to cover a portion only of the field of said aligned units, said segment having a surface factor to produce a required refractive power in combination with the parts of the main lens aligned with it, and a thickness and shape factor to produce a required magnification in combination with the parts of the main lens aligned with it.

6. A lens comprising a plurality of aligned lens units forming a major focal field, each of said units being of substantially the full size of the lens, a segment or minor focal field positioned on one of said units within a portion only of the field of said unit, said segment having a surface factor to produce a required refractive power in combination with the parts of the main lens aligned with it, and a thickness and shape factor to produce a required magnification in combination with the parts of the main lens aligned with it, one of said focal fields being optically equivalent to a lens system comprising two aligned lens parts, one of said parts having optical surfaces on its two sides of curvatures to produce a required refractive power and the other of said parts having optical surfaces on its two sides of curvatures to produce a no power refractive power and a required magnification said magnification being a function of the thickness of said part and its shape due to the bending or cupping thereof and means associated with one of said focal fields for varying the optical properties of said field.

EDGAR D. TILLYER.